Feb. 5, 1946.  L. P. CROSMAN  2,394,429
REVERSIBLE CLUTCH
Filed Oct. 2, 1943  3 Sheets-Sheet 1

Inventor
Loring P. Crosman,
By C. W. Anderson & Son.
Attorneys

Feb. 5, 1946.                L. P. CROSMAN                2,394,429
                           REVERSIBLE CLUTCH
                         Filed Oct. 2, 1943              3 Sheets-Sheet 3

Inventor
Loring P. Crosman,
By E. W. Anderson & Son.
Attorneys

Patented Feb. 5, 1946

2,394,429

UNITED STATES PATENT OFFICE 2,394,429

REVERSIBLE CLUTCH

Loring Pickering Crosman, South Orange, N. J., assignor to Monroe Calculating Machine Company, Orange, N. J., a corporation of Delaware Application October 2, 1943, Serial No. 504,766

14 Claims. (Cl. 192—48)

The invention relates to reversible clutches, rendered effective for transmitting the movement of a driving shaft rotating in a single direction to a driven shaft to drive the latter in one or alternatively the opposite direction upon operation of suitable control means, and rendered ineffective upon completion of a machine cycle following release or restoration of the control means to neutral position, the clutch remaining effective for an indefinite number of machine cycles so long as said control means remains in operative position. An object of the invention is to provide an improved device of this description certain advantages of which will be noted hereinafter or will be obvious.

The invention consists in the novel construction and combinations of parts as hereinafter set forth in the claims.

In the accompanying drawings,

Figure 5 is a partial section showing the relation of the driving and driven clutch members to the driving shafts.

Figure 1:
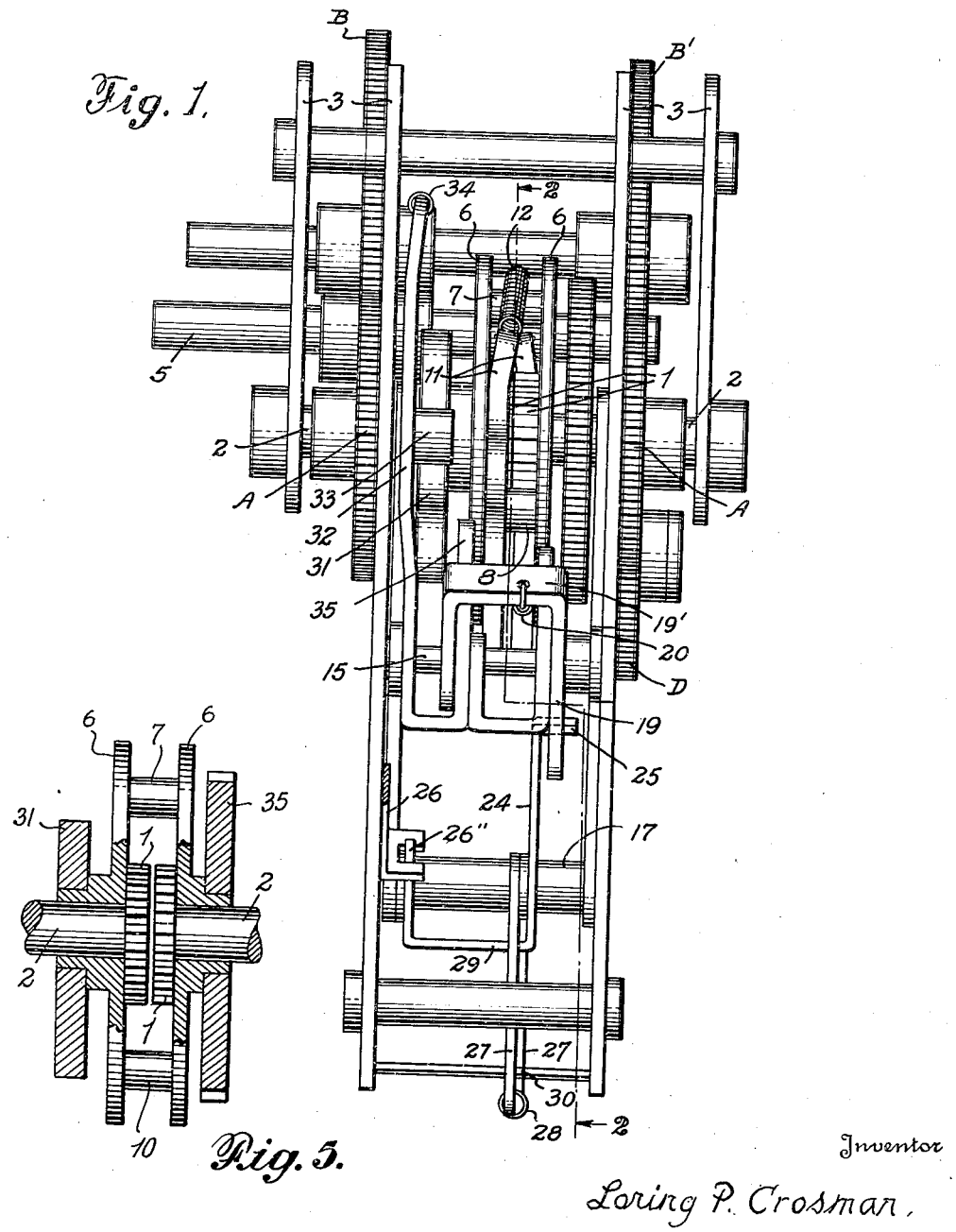
Figure 1 is an end elevation of the reversible clutch.
Figure 2:
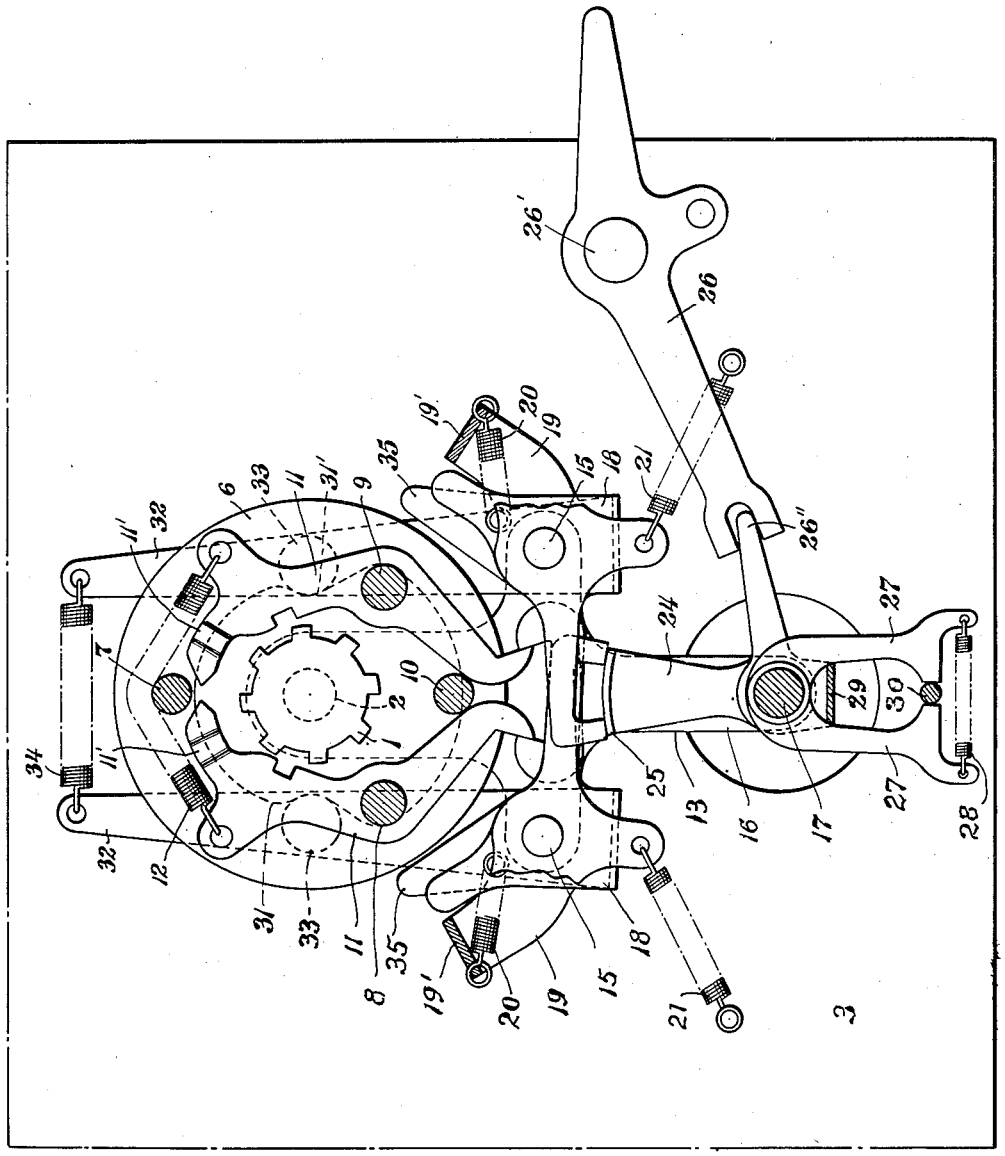
Figure 2 is a section on the line 2—2, Fig. 1.
Figure 3:
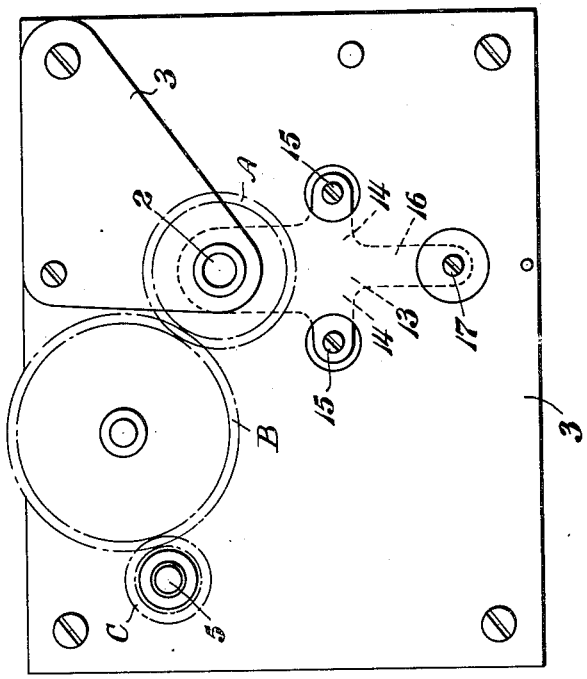
Figure 3 is a right side elevation of the stationary frame, showing the gearing, etc., upon said side.
Figure 4:
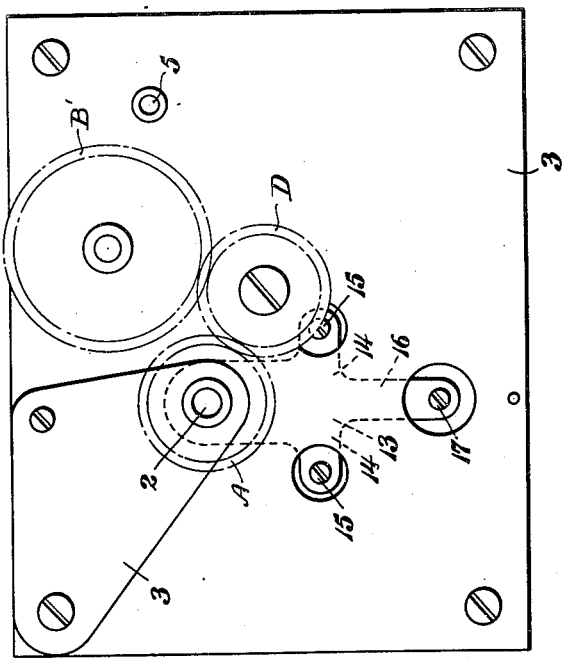
Figure 4 is a left side elevation of the stationary frame showing the gearing, etc.; upon said side.

In these drawings, the numeral 1 designates two oppositely rotating annular toothed driving clutch members, the shafts 2 of which have rotary bearings in the stationary frame 3, said shafts being driven in opposite directions at the same rate of speed by suitable gearing from a single drive shaft 5 having a motor connection. This gearing is shown as including a gear A fast upon each of the drive shafts 2, the one gear A having an intermediate gear connection B with and being driven by a gear C upon the drive shaft 5, and the other gear A having an intermediate gear connection D with and being driven by a gear B' upon the same shaft as that of the gear B.

Located intermediately of these driving clutch members is the driven clutch member, which is reversible and includes two opposite spaced disks 6, concentric with and loosely mounted upon both of the shafts 2, said disks being rigidly connected together by transverse spaced cross pins 7, 8, 9 and 10; and two spring-urged clutch levers or elements 11, fulcrumed respectively upon the pins 8 and 9, the reversible clutch being rendered normally ineffective by the engagement of suitable latch means to be described with the spring-urged clutch levers.

The clutch levers 11 are respectively adapted upon release of the related latch means to engage a tooth of and establish a driving connection with one or alternatively the other of said clutch members 1 to start a machine cycle. Adjacent arms of these clutch levers are connected together by a single coiled spring 12, thereby urging the inner notched or toothed portions of said adjacent arms towards the annular toothed driving clutch members 1. These clutch levers have offset portions 11' adapted to interlock to prevent simultaneous engagement of said levers with both of the driving clutch members 1.

A cushion frame includes opposite spaced plates 13, pivoted at one end thereof upon both of the shafts 2 adjacent the opposite sides of the stationary frame 3, said plates having each opposite lateral extensions 14 the free ends of which are connected by two cross pins 15, and each opposite lower extensions 16, the free ends of which are connected by cross pin 17.

The spring-urged latch means are carried by said cushion frame and hold said clutch levers normally disengaged against the tension of their spring 12 and in contact at the adjacent lower ends thereof with said cross pin 10 to lock the driven member to said cushion frame. The latch means for each clutch lever includes two levers 18 and 19 fulcrumed both upon the same pin 15, and one 18 of which has a tensioning spring connection 20 with the other to hold adjacent arms of the two levers in contact, and the other 19 of which has normally a bearing against an arcuate lug of a trigger lever to be described and a tensioning spring connection 21 with the stationary frame 3, the two springs 21 of the two latch means constituting centralizing spring for said cushion frame.

Shiftable control means are provided for releasing the latch means of one or alternatively the other of said clutch levers to start a machine cycle including a trigger lever 24 fulcrumed upon said cross pin 17 of the cushion frame and one arm of which is provided at its free end with the arcuate lug aforesaid designated 25, said lug being concentric with cross pin 17. An operating lever 26 fulcrumed upon the stationary frame 3 at 26' has actuating engagement 26" with said trigger lever and is shifted in one or alternatively the opposite direction to shift the trigger lever in one or the other direction for the purpose stated. The actuating engagement aforesaid at 26" is adapted to

to interlock to prevent simultaneous engagement with both oppositely rotating members, spring-urged latch means for maintaining said clutch elements normally disengaged, and shiftable control means for releasing the latch means of one or alternatively the other of said clutch elements to start a cycle of rotation.

5. In a reversible clutch, two oppositely rotating driving clutch members, a single driven member concentric with said driving members and having two spring-urged clutch elements adapted respectively to engage and establish a driving connection with one or alternatively the other of said oppositely rotating members, spring-urged latch means for maintaining said clutch elements normally disengaged, shiftable control means for releasing the latch means of one or alternatively the other of said clutch elements to start a cycle of rotation, and means for restoring the parts to normal position including means for momentarily speeding up the driven member to facilitate disengagement of the clutch element.

6. In a reversing clutch, two oppositely rotating driving clutch members, a single driven member concentric with said driving members and having two spring-urged clutch elements adapted respectively to engage and establish a driving connection with one or alternatively the other of said oppositely rotating members, a centralized cushion frame yieldable in either of two opposite directions, spring-urged latch means carried by said cushion frame for maintaining said clutch elements normally disengaged, and shiftable control means for releasing the latch means of one or alternatively the other of said clutch elements to start a cycle of rotation.

7. In a reversible clutch, two oppositely rotating driving clutch members, a single driven member concentric with said driving members and having two spring-urged clutch elements adapted respectively to engage and establish a driving connection with one or alternatively the other of said oppositely rotating members, said clutch elements having offset portions adapted to interlock to prevent simultaneous engagement with both oppositely rotating members, a centralized cushion frame yieldable in either of two opposite directions, spring-urged latch means carried by said cushion frame for maintaining said clutch elements normally disengaged, shiftable control means for releasing the latch means of one or alternatively the other of said clutch elements to start a cycle of rotation, centering means for maintaining the control means normally in neutral position, and means for restoring the latch means to normal position including means for momentarily speeding up the driven member to facilitate disengagement of the clutch element.

8. In a reversible clutch, two oppositely rotating toothed driving clutch members, a reversible single driven member concentric with said driving members and having an abutment and two spring-urged clutch elements adapted respectively to engage a tooth of and establish a driving connection with one or alternatively the other of said oppositely rotating members, said clutch elements having offset portions adapted to interlock to prevent simultaneous engagement with both oppositely rotating members, a centralized cushion frame yieldable in either of two opposite directions, spring-urged latch means carried by said cushion frame for maintaining said clutch elements normally disengaged and in contact with said abutment for locking the driven member to the cushion frame, and shiftable control means for releasing the latch means of one or alternatively the other of said clutch elements to start a cycle of rotation.

9. In a reversible clutch, two oppositely rotating toothed driving clutch members, a reversible single driven member concentric with said driving member and having an abutment and two spring-urged clutch elements adapted respectively to engage a tooth of and establish a driving connection with one or alternatively the other of said oppositely rotating members, said clutch elements having offset portions adapted to interlock to prevent simultaneous engagement with both oppositely rotating members, a centralized cushion frame yieldable in either of two opposite directions, spring-urged latch means carried by said cushion frame for maintaining said clutch elements normally disengaged and in contact with said abutment for locking the driven member to the cushion frame, shiftable control means for releasing the latch means of one or alternatively the other of said clutch elements to start a cycle of rotation, centering means for maintaining the control means normally in neutral position, and means for restoring the latch means to normal position and relocking the driven member to the cushion frame at the end of the cycle.

10. In a reversible clutch, two oppositely rotating toothed driving clutch members, a reversible single driven member concentric with said driving members and having an abutment and two spring-urged clutch elements adapted respectively to engage a tooth of and establish a driving connection with one or alternatively the other of said oppositely rotating members, said clutch elements having offset portions adapted to interlock to prevent simultaneous engagement with both oppositely rotating members, a centralized cushion frame yieldable in either of two opposite directions, spring-urged latch means carried by said cushion frame for maintaining said clutch elements normally disengaged and in contact with said abutment for locking the driven member to the cushion frame, shiftable control means for releasing the latch means of one or alternatively the other of said clutch elements to start a cycle of rotation, centering means for maintaining the control means normally in neutral position, and means for restoring the latch means to normal position and relocking the driven member to the cushion frame at the end of the cycle including means for momentarily speeding up the driven member to facilitate disengagement of the clutch element.

11. In a reversible clutch, two oppositely rotating driving clutch members, a driven member concentric therewith and having an abutment and two spring-urged clutch elements adapted respectively to engage and establish a driving connection with one or alternatively the other of said oppositely rotating members, said clutch elements having offset portions adapted to interlock to prevent simultaneous engagement with both oppositely rotating members, a centralized cushion frame pivoted concentrically with the driving and driven members and yieldable in either of two opposite directions, spring-urged latch means carried by said cushion frame for maintaining said clutch elements normally disengaged and in contact with said abutment for locking the driven member to the cushion frame, shiftable control means for releasing the latch means of one or alternatively the other of said clutch elements to start a cycle of rotation, centering means for maintaining the control means normally in neutral position, and means for restoring the latch means to normal position and relocking the driven member to the cushion frame at the end of the cycle.

12. In a reversible clutch, two oppositely rotating driving clutch members, a driven member concentric with the driving members and having an abutment and two spring-urged clutch elements adapted respectively to engage and establish a driving connection with one or alternatively the other of said oppositely rotating members, a cushion frame pivoted concentrically with the driving and driven members, spring-urged latch means carried by the cushion frame for maintaining said clutch elements normally disengaged and in contact with said abutment for locking the driven member to the cushion frame, shiftable control means for releasing the latch means of one or alternatively the other of said clutch elements to start a cycle of rotation, and centering means for maintaining the control means normally in neutral position with both clutch elements disengaged, said latch means and said control means having a pivoted trigger common thereto and provided with an arcuate lug, the latch means for each clutch element including two members having a common pivot and one of which has a tensioning spring connection with the other and the other of which has a tensioning spring connection with the stationary frame constituting a centering spring for said cushion frame, said other member having normally a bearing against said arcuate lug.

13. In a reversible clutch, two oppositely rotating driving clutch members, a driven member concentric therewith and having an abutment and two spring-urged clutch elements adapted respectively to engage and establish a driving connection with one or alternatively the other of said oppositely rotating members, a cushion frame pivoted concentrically with the driving and driven members, spring-urged latch means carried by the cushion frame for maintaining the clutch elements normally disengaged and in contact with said abutment for locking the driven member to the cushion frame, shiftable control means for releasing the latch means of one or alternatively the other of said clutch elements to start a cycle of rotation, and spring-urged centering means for maintaining the control means normally in neutral position with both clutch elements disengaged, said latch means and said control means having a pivoted trigger common thereto and provided with an arcuate lug, the latch means for each clutch element including two members having a common pivot and one of which has a tensioning spring connection with the other and the other of which has normally a bearing against said arcuate lug and a tensioning spring connection with the stationary frame constituting a centering spring for said cushion frame, said other member having in released position engagement with an end of said arcuate lug to prevent reverse shifting of the trigger, and means for restoring the latch means to normal position and relocking the driven member to the cushion frame at the end of the cycle including a cam mounted upon the driven member concentrically thereof and cam followers mounted upon the cushion frame, the spring of said centering means functioning to restore the same and said trigger at the end of the cycle.

14. In a reversible clutch, two aligned drive shafts having at adjacent opposed ends thereof two oppositely rotating driving clutch members, a single driven member concentric with said driving members and having two spring-urged clutch elements adapted respectively to engage and establish a driving connection with one or alternatively the other of said driving clutch members, spring-urged latch means for holding said clutch elements normally disengaged, and shiftable control means for releasing the latch means of one or alternatively the other of said clutch elements to start a cycle of rotation.

LORING PICKERING CROSMAN.